United States Patent
Brown et al.

(10) Patent No.: US 10,955,264 B2
(45) Date of Patent: Mar. 23, 2021

(54) FIBER OPTIC LINE FOR MONITORING OF WELL OPERATIONS

(71) Applicant: Saudi Arabian Oil Company, Dhahran (SA)

(72) Inventors: Jonathan W. Brown, Aberdeen (GB); Kirk Bartko, Dhahran (SA); Brett Bouldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/878,919

(22) Filed: Jan. 24, 2018

(65) Prior Publication Data
US 2019/0226882 A1    Jul. 25, 2019

(51) Int. Cl.
*E21B 23/14*    (2006.01)
*G08C 23/06*    (2006.01)
(Continued)

(52) U.S. Cl.
CPC ............ *G01D 5/268* (2013.01); *E21B 19/22* (2013.01); *E21B 23/14* (2013.01); *E21B 43/127* (2013.01);
(Continued)

(58) Field of Classification Search
CPC .................................................... G01D 5/268
See application file for complete search history.

(56) References Cited

U.S. PATENT DOCUMENTS 2,558,427 A    6/1951 Fagan
2,850,976 A    9/1958 Seifert
(Continued)

FOREIGN PATENT DOCUMENTS

GB    2349440 A    11/2000
GB    2522211 A    7/2015
(Continued)

OTHER PUBLICATIONS

Wikipedia; "Torpedo" available as of Feb. 21, 2019 at: https://en.wikipedia.org/wiki/Torpedo; pp. 1-19.
(Continued)

*Primary Examiner* — Joseph H Feild
*Assistant Examiner* — Pameshanand Mahase
(74) *Attorney, Agent, or Firm* — Bracewell LLP; Constance G Rhebergen; Ryan B McBeth

(57) ABSTRACT

A new method of gathering data real time during production or simulation tests using a gravity deployed tool, referred to as a fiber-line intervention tool ("FLI" or "FLIT") to monitor bottom-hole pressure and temperature for well testing including the testing of adjacent wells is provided. In an embodiment, the tool is configured to include a housing, spooled fiber-line, sensors such as pressure and temperature sensors, and connections between the fiber-line and sensors such that measurement information from the sensors can be sent to the surface in real time over the fiber-line. As the housing is deployed into a well, the fiber-line can unwind, thereby providing a communication pathway from below the surface to above the surface. In an embodiment the housing can be deployed through a wellhead and down the wellbore. In an embodiment, the housing can be made of a soluble material.

11 Claims, 8 Drawing Sheets

(51) Int. Cl.

| | | |
|---|---|---|
| *E21B 47/12* | (2012.01) | |
| *H04B 10/12* | (2006.01) | |
| *G01D 5/26* | (2006.01) | |
| *G01V 11/00* | (2006.01) | |
| *E21B 19/22* | (2006.01) | |
| *E21B 43/12* | (2006.01) | |
| *E21B 47/135* | (2012.01) | |

(52) U.S. Cl.
CPC .......... *E21B 47/135* (2020.05); *G01V 11/002* (2013.01); *G08C 23/06* (2013.01)

(56) References Cited

U.S. PATENT DOCUMENTS

| | | | |
|---|---|---|---|
| 2,937,824 | A | 5/1960 | Krumbholz et al. |
| 3,158,994 | A | 12/1964 | Hodgson |
| 3,171,379 | A | 3/1965 | Schell, Jr. et al. |
| 3,210,937 | A | 10/1965 | Perry. Jr. |
| 3,230,708 | A | 1/1966 | Huang et al. |
| 3,252,281 | A | 5/1966 | Everett et al. |
| 3,442,083 | A | 5/1969 | De Klotz |
| 3,917,007 | A | 11/1975 | Tsiferov |
| 3,928,102 | A | 12/1975 | Rowe et al. |
| 4,676,310 | A | 6/1987 | Scherbatskoy et al. |
| 4,907,763 | A | 3/1990 | Pinson |
| 4,997,047 | A | 3/1991 | Schroeder |
| 5,012,991 | A | 5/1991 | Pinson |
| 5,396,951 | A | 3/1995 | Ross |
| 5,570,437 | A | 10/1996 | Kluth et al. |
| 5,574,246 | A | 11/1996 | Meyers et al. |
| 5,996,930 | A | 12/1999 | Katayama et al. |
| 6,269,198 | B1 | 7/2001 | Hodgson et al. |
| 6,273,189 | B1 | 8/2001 | Gissler et al. |
| 6,411,565 | B1 | 6/2002 | Sirmalis et al. |
| 6,581,537 | B2 | 6/2003 | McBride et al. |
| 6,845,819 | B2 | 1/2005 | Barrett et al. |
| 6,847,034 | B2 | 1/2005 | Shah et al. |
| 7,077,200 | B1 | 7/2006 | Adnan et al. |
| 7,578,121 | B2 | 8/2009 | Chang et al. |
| 7,617,873 | B2 | 11/2009 | Lovell et al. |
| 8,079,414 | B2 | 12/2011 | Smaardyk et al. |
| 8,981,957 | B2 | 3/2015 | Gano et al. |
| 9,109,944 | B2 | 8/2015 | Den Boer et al. |
| 9,127,531 | B2 | 9/2015 | Maida et al. |
| 9,180,946 | B2 | 11/2015 | Fuhr |
| 9,222,333 | B2 | 12/2015 | Hoffman et al. |
| 9,726,006 | B2 | 8/2017 | Kare |
| 9,869,819 | B2 | 1/2018 | Stone et al. |
| 2003/0010495 | A1 | 1/2003 | Mendez et al. |
| 2005/0236161 | A1* | 10/2005 | Gay .................. E21B 47/123 |
| | | | 166/380 |
| 2006/0171821 | A1* | 8/2006 | Brown .................. F04B 47/02 |
| | | | 417/390 |
| 2008/0073077 | A1 | 3/2008 | Tunc et al. |
| 2008/0135259 | A1* | 6/2008 | Brown .................. E21B 43/127 |
| | | | 166/369 |
| 2008/0272931 | A1 | 11/2008 | Auzeras et al. |
| 2009/0050329 | A1 | 2/2009 | Johnson et al. |
| 2010/0147587 | A1 | 6/2010 | Henderson et al. |
| 2010/0181072 | A1 | 7/2010 | Gillan |
| 2011/0135247 | A1 | 6/2011 | Achara et al. |
| 2012/0080189 | A1 | 4/2012 | Marya et al. |
| 2012/0305234 | A1* | 12/2012 | Vowels .................. E21B 37/00 |
| | | | 166/90.1 |
| 2013/0025852 | A1 | 1/2013 | Edmonstone et al. |
| 2013/0167628 | A1 | 7/2013 | Hull et al. |
| 2013/0249705 | A1 | 9/2013 | Sharp et al. |
| 2014/0054031 | A1 | 2/2014 | Heijnen et al. |
| 2014/0144224 | A1* | 5/2014 | Hoffman ............... E21B 33/134 |
| | | | 73/152.18 |
| 2014/0311755 | A1 | 10/2014 | Al-Badran |
| 2014/0376332 | A1* | 12/2014 | Vigneaux ................ G01V 1/42 |
| | | | 367/25 |
| 2015/0184468 | A1 | 7/2015 | Sherman |
| 2016/0084055 | A1 | 3/2016 | Moore et al. |
| 2016/0123081 | A1 | 5/2016 | Russell et al. |
| 2016/0215578 | A1 | 7/2016 | Adnan et al. |
| 2016/0215579 | A1 | 7/2016 | Van Der Ende |
| 2016/0237812 | A1 | 8/2016 | Foucher et al. |
| 2016/0251941 | A1 | 9/2016 | Murphree et al. |
| 2017/0067328 | A1 | 3/2017 | Chauffe et al. |
| 2017/0075017 | A1 | 3/2017 | Jasskelainen et al. |
| 2017/0145760 | A1 | 5/2017 | Poyet et al. |
| 2017/0160422 | A1 | 6/2017 | Donderici et al. |
| 2017/0218752 | A1 | 8/2017 | Donderici et al. |
| 2017/0268908 | A1* | 9/2017 | DiFoggio ............... G01H 9/004 |
| 2017/0314341 | A1 | 11/2017 | Lovell et al. |
| 2017/0314372 | A1 | 11/2017 | Tolman et al. |
| 2017/0342822 | A1 | 11/2017 | Wilson et al. |
| 2018/0058196 | A1 | 3/2018 | Jaaskelainen et al. |
| 2018/0066490 | A1 | 3/2018 | Kjos |
| 2018/0294118 | A1* | 10/2018 | Furuuchi ................ G01M 3/16 |

FOREIGN PATENT DOCUMENTS

| | | |
|---|---|---|
| WO | 2013011130 A1 | 1/2013 |
| WO | 2015181541 A2 | 2/2015 |
| WO | 2015047399 A1 | 4/2015 |
| WO | 2016079512 A1 | 5/2016 |
| WO | 2017009671 A1 | 1/2017 |
| WO | 2017074365 A1 | 5/2017 |
| WO | 2017105435 A1 | 6/2017 |

OTHER PUBLICATIONS

AFL "MiniBend(R) Fiber Optic Component for Downhole Double-ended Systems and Optical Connectivity" availble at: https://www.aflglobal.com/productlist/Product-Lines/Fiber-Optic-Cable/MiniBend_for_Downhole_Double-Ended_Systems_Optic/doc/MiniBend.aspx; p. 1.

Bakulin, Andrey et al.; "Smart DAS upholes for near surface model building and deep imaging with vertical arrays" ICEG2017, Oct. 9-12, 2017, Al-Ain, Abu Dhabi, UAE; pp. 252-255.

Higginson et al., "Advancing the Application of Downhole Fibre Optics with a Novel Low Cost Disposable Deployment Method", SPE Offshore Europe Conference & Exhibition, 2017, pp. 1-9, Soceity of Petroleum Engineers.

International Search Report and Written Opinion for related PCT application PCT/US2019/014896 (SA5819) dated Apr. 9, 2019; pp. 1-14.

Miller; Douglas E.; "DAS and DTS at Brady Hot Springs: Observations about Coupling and Coupled Interpretations" SGP-TR-213, 43rd Workshop on Geothermal Reservoir Engineering, Stanford University, Feb. 12-14, 2018; pp. 1-13.

Wikipedia; "APR-3E torpedo" available as of Apr. 17, 2018 at: https://en.wikipedia.org/wiki/APR-3E_torpedo; pp. 1-2.

Wikipedia; "Rocket engine" available as of Feb. 21, 2019 at: https://en.wikipedia.org/wiki/Rocket_engine; pp. 1-26.

International Search Report arid Written Opinion for International Application No. PCT/US2020/029844 (SA5903PCT) dated Jul. 3, 2020; pp. 1-16.

\* cited by examiner

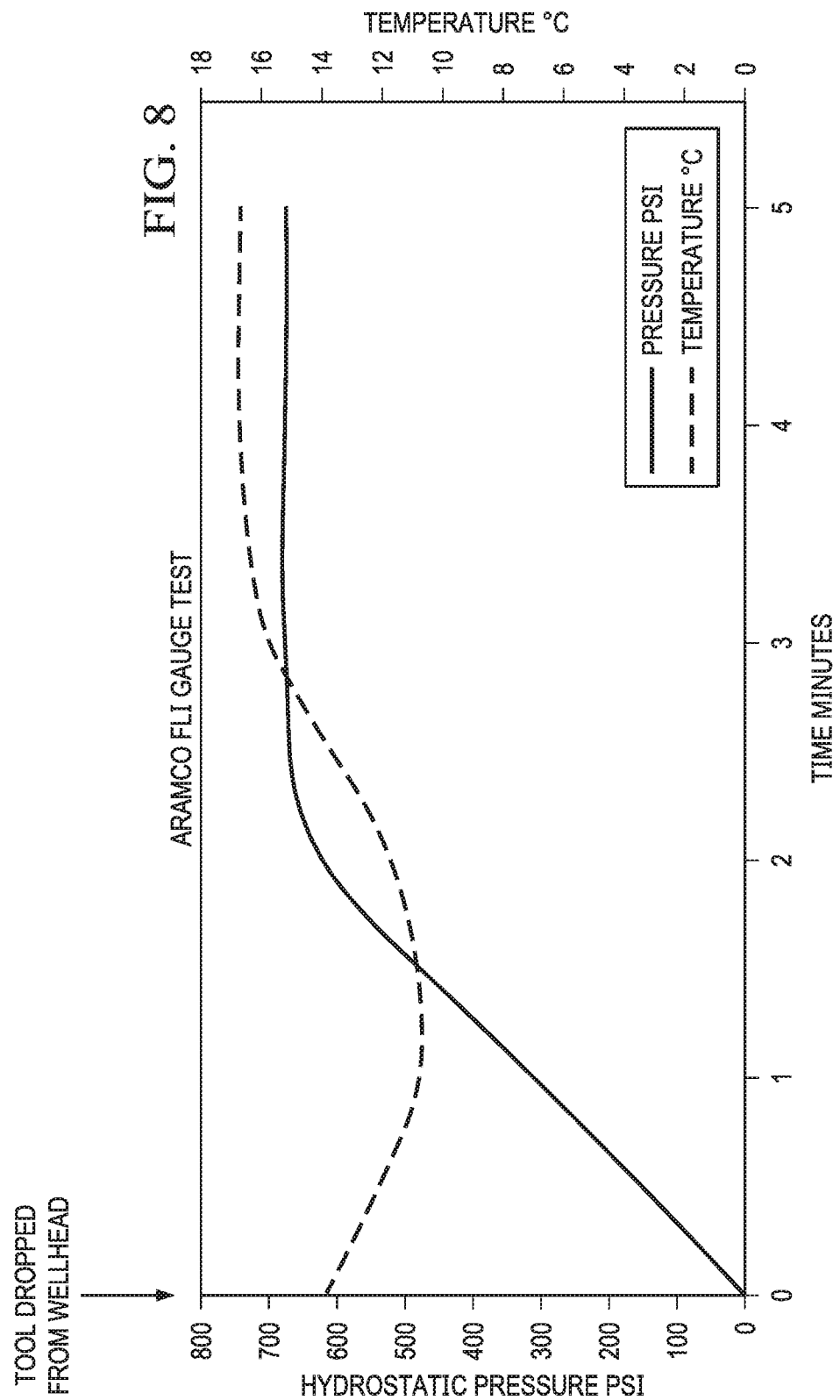

FIBER OPTIC LINE FOR MONITORING OF WELL OPERATIONS

Embodiments of the present disclosure relate to deployable pressure and temperature sensors deployed on fiber optic communication lines for downhole monitoring.

Oil and gas well data communication from below surface to above surface has existed for some time. Downhole to surface communications are often achieved by using systems that employ wireline, coiled tubing, permanent wire installations, acoustic telemetry, mud pulse telemetry, electro-magnetic systems, or combinations of multiple systems. For mud pulse telemetry systems pressure pulses can be sent to the surface and back. Mud pulse communications can further be encoded into the pulses to be received by sensitive receivers and computer decoding systems. Similarly, for each of the communication methods previously known, communications are often encoded into a specific protocol that both sending and receiving units are equipped to receive, decode, and relay. There are some weaknesses to previous systems and methods. For example, permanent wires and control lines need to be planned and designed in as part of a pre-engineered system before a completion job is run. Such systems can be expensive and time consuming both on the engineering side and on the deployment side. Users will often avoid such systems due to the time, expense, and complexity that they entail. Electromagnetic systems are also relatively expensive to run and can be effected by rock resistivity and other geological formation induced effects. As a result, electromagnetic systems cannot be utilized in all scenarios where desired. Geological formations and distance considerations can also effect acoustic telemetry systems, for example, signals can become attenuated and require repeaters because the signals cannot propagate over the desired distances. Running memory tools or acoustic tools with repeaters can also require multiple slickline runs and multiple sets of repeater hardware. These described systems thus suffer from the same time, expense, and complexity issues as other downhole communication solutions.

Due to the shortcomings of the previously described systems and methods, one other solution has been developed where logging tools with memory are deployed and used to collect data. This system and method also has a weakness in that the processing and evaluation steps for this type of tool cannot be accomplished until after the tool returns to the surface and the memory contents can be transferred. There is thus a significant need for a tool that has a reduced cost and complexity, is less time consuming to engineer, configure, and deploy, and can provide real time data which can then be used to make real time or near real time decisions.

SUMMARY

Embodiments of the present disclosure aim to provide a gravity deployed tool, referred to as a fiber-line intervention tool ("FLI" or "FLIT") to monitor bottom-hole pressure and temperature as well as numerous other parameters that may be desirable to monitor for well testing including the testing of adjacent wells. In an embodiment, a disposable tool is provided that is configured to free-fall into a well. Such a tool eliminates the need for a large spread of equipment on location to run and retrieve the tool. In an embodiment the tool can be configured with a deployable spool of fiber-line enclosed within the housing of the tool. The housing can be dropped into a well deploying the fiber-line as the housing drops until it stops due to friction, ends up at the bottom of the well, or reaches the end of the spool. In an embodiment, the housing can be made of a soluble material. In an embodiment the tool can further be configured with bottom-hole pressure ("BHP") and bottom-hole temperature ("BHT") sensors that allow BHP and BHT measurements to be made and communicated to the surface in real time. Real time communication capability of these measured values allows production interference testing to be completed quickly due to the real time feedback for pressure and temperature transients. In an embodiment, the system can also allow for the monitoring of BHP and BHT while the well is flowed or shut-in for extended durations up to, for example, six months' time.

In an embodiment, a battery powered reduced form factor computer, referred to as a "micro-computer," can be configured and deployed with the BHP and BHT sensors such that the micro-computer is configured to interface with the sensors and record and communicate measurements taken by the sensors at regular intervals to the surface via the fiber-line. The micro-computer can be configured with fiber-line communication equipment including transmitters to send data to the surface. In an embodiment, the micro-computer can also be configured with receivers to receive communications and control signals from the surface. In an embodiment a micro-computer can be configured with a processor, memory, and input/output ports. In an embodiment, the micro-computer can also be configured with software that allows it to transmit measurement information to the surface and also receive control communications or other communications from the surface.

In an alternative embodiment, the downhole housing can be configured with various other sensors and sensor packages as may be desirable to monitor for a particular well.

In an embodiment, the BHP and BHT sensors, as well as other sensors that may be configured, can also be configured to directly connect to the fiber-line and send measurement communications to the surface directly without the need for a micro-computer to be configured as part of the deployed package. In such an embodiment, the configured sensors or sensor packages can send measurement data over fiber-line directly without the need for additional equipment. In an embodiment, a multiplexer can be configured to manage and separate the communications between various sensors. In an embodiment, bus communications management protocols can be employed to manage and separate the communications between various sensors.

The fiber-line intervention tool is also an option for wells where a Permanent Down Hole Measurement System ("PDHMS") has stopped working. In an embodiment, a fiber-line running to the surface from a FLIT can connect to fiber-line communications equipment at the well head that communicates to or includes a data acquisition unit that can transmit the data real time to another onsite location or even offsite.

The embodiments described aim to provide a novel method that can be implemented in many different wells and in conjunction with many different operations including adjacent well monitoring of completions operations such as downhole fracking.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 8 illustrates an example of a hydrostatic pressure test over time as can be measured by sensors deployed in a FLIT.

DETAILED DESCRIPTION

The described embodiments relate to an improved, gravity deployed tool, referred to as a fiber-line intervention tool ("FLI" or "FLIT") to monitor bottom-hole pressure and temperature for well testing including the testing of adjacent wells is provided. In an embodiment, the tool is configured to include a housing, spooled fiber-line, sensors such as pressure and temperature sensors, and connections between the fiber-line and sensors such that measurement information from the sensors can be sent to the surface in real time over the fiber-line. As the housing is deployed into a well, the fiber-line can unwind, thereby providing a communication pathway from below the surface to above the surface. In an embodiment the housing can be deployed through a wellhead and down the wellbore. In an embodiment, the housing can be made of a soluble material. Other embodiments and configurations are also described herein.

Figure 1:
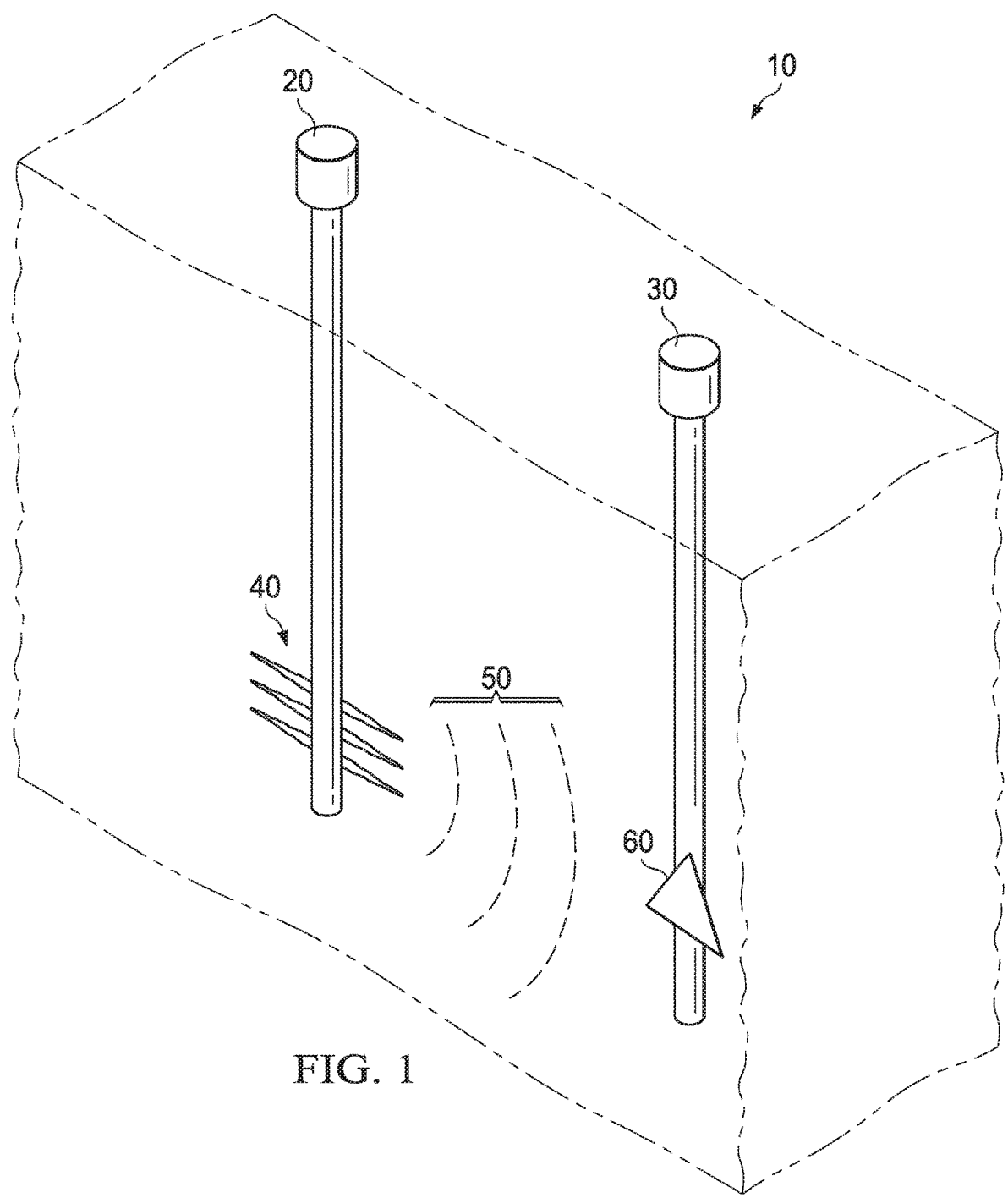
FIG. 1 illustrates a wellsite having two adjacent wellbores where one wellbore is undergoing well testing operations and where an embodiment of a fiber-line intervention tool ("FLI" or "FLIT") is deployed in the second wellbore.

Referring to FIG. 1, a wellsite 10 is shown where a first wellbore 20 is adjacent a second wellbore 30. The first wellbore 20 is shown undergoing fracking operations or production tests at or near the base of the wellbore 40. These operations can cause downhole fluid pressures to change and such that pressure waves 50 are created and in turn can be detected in adjacent wellbores to give an understanding of the connectivity between the well bores. In an embodiment a fiber-line intervention tool ("FLI" or "FLIT") 60 is deployed in the second wellbore and configured with bottom-hole pressure and bottom-hole temperature sensors such that the fracking completions operations in the first wellbore 20 can be monitored. In an embodiment the fiber-line intervention tool sends pressure and temperature measurements to the surface in real time for evaluation by surface computer systems and personnel. This information can also be transmitted offsite for analysis.

Figure 2:
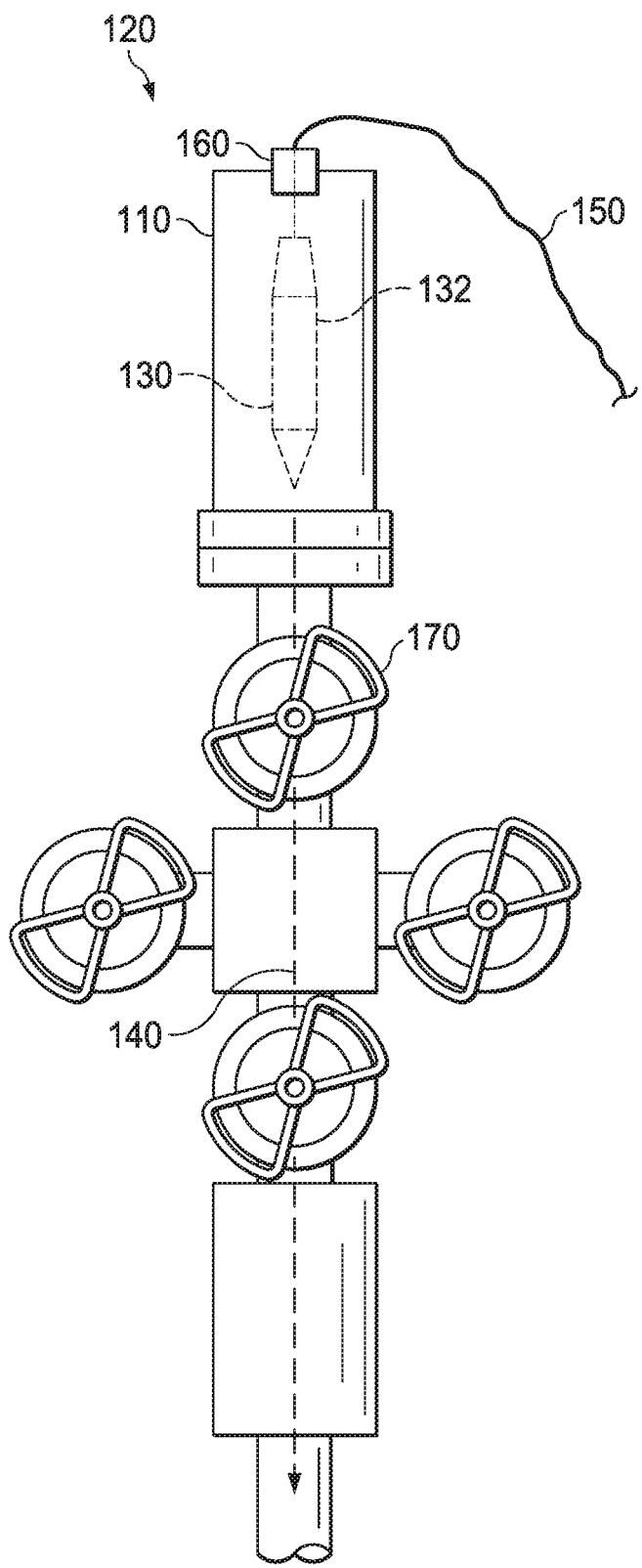
FIG. 2 illustrates a wellhead configured on a wellbore and further configured to receive an embodiment of a FLIT deployed down the central passage of the wellhead.

Referring to FIG. 2, a surface deployment cap 110 is configured on a wellhead 120 and further configured to receive an embodiment of a fiber-line intervention tool 130 with a fiber-line 150 extending from the tool 130. In an embodiment the FLIT can include a housing 132. In an alternative embodiment, the housing 132 can be made of from a soluble material. The FLIT can be deployed down the central passage 140 of the wellhead 120. In an embodiment a pressure barrier 160 can is fitted to the surface deployment cap 110 to allow the fibreline to exit the wellhead 120.

In an embodiment the FLIT can comprise, a pressure sensor and a temperature sensor as well as a spooled portion of a fiber-line that can unwind as the fiber-line deploys into a well.

Figure 3:
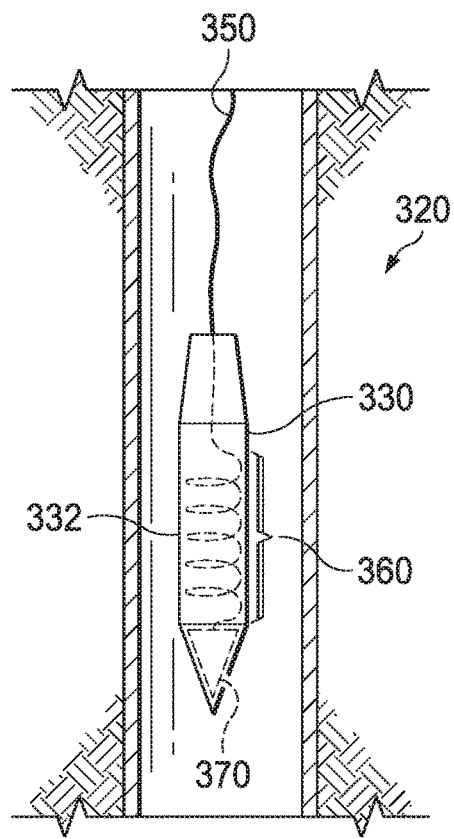
FIG. 3 illustrates an embodiment of a FLIT traveling down a wellbore.

Referring to FIG. 3, an embodiment of a FLIT 330 traveling down a wellbore 320 is shown. In an embodiment the FLIT can be configured with a housing 332 that is made of a soluble material that can be configured and specified to dissolve after a certain exposure period or time interval. In an embodiment, the housing 332 can be made of soluble materials such as magnesium alloys or other dissolvable alloys, materials, or combinations thereof. Desired exposure intervals can be pre-determined, for example, a time period from 30-days up to 6 months may be desirable, or even up to years in extreme cases. The dissolvable material selection and the housing configuration can be configured to match to a specific use case or scenario. In an embodiment, a spool of fiber-line 360 can be configured such that the spool of fiber-line unwinds as the tool is deployed and a fiber-line 350 is thereby made to extend between the surface and the tool. In an embodiment, the fiber-line can have a protective shroud or coating on it such that it is made to be more durable and can withstand the downhole environment. In an embodiment the tool can further be configured with bottom-hole pressure ("BHP") and bottom-hole temperature ("BHT") sensors 370 that allow BHP and BHT measurements to be made and communicated to the surface in real time over the fiber-line. Real time communication capability of these measured values allows production interference testing to be completed quickly due to the real time feedback for pressure and temperature transients. In an embodiment, the system can also allow for the monitoring of BHP and BHT while the well is flowed for extended durations up to, for example, six months' time. An embodiment can also include a single BHP gauge, a single BHT gauge, or both, or multiple sensors or sensor packages. In an embodiment a sensor or sensor package can also include a fiber-line communications interface that that communicates the sensor or sensor packages measurement information on the fiber-line.

Figure 4:
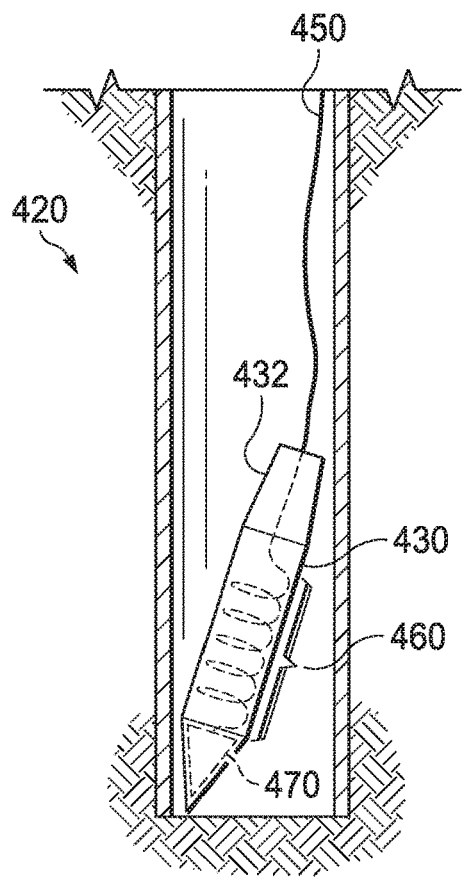
FIG. 4 illustrates an embodiment of a FLIT traveling down a wellbore and reaching the bottom or "sump" of the well.

Referring to FIG. 4 an embodiment of a FLIT 430 traveling down a wellbore 420 and reaching the bottom or "sump" of the well is shown. Similarly to FIG. 3, the FLIT 430 includes a soluble housing 432, a spool of fiber-line 460, and configured sensors 470. Deployed fiber-line 450 extends between the tool and a receiver at or near the surface.

Figure 5:
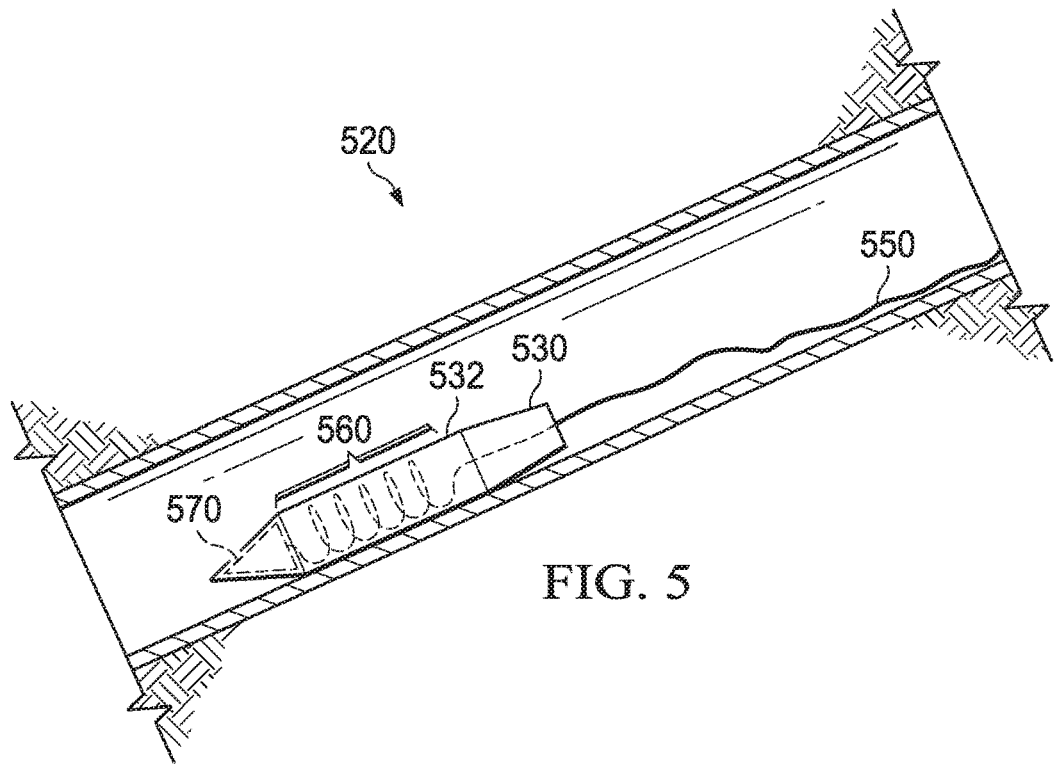
FIG. 5 illustrates an embodiment of a FLIT traveling down a wellbore of a deviated well.

Referring to FIG. 5 an embodiment of a FLIT 530 traveling down a wellbore of a deviated well 520 and reaching a resting point in the deviated well section. Similarly to FIGS. 3 and 4, the FLIT 530 includes a soluble housing 532, a spool of fiber-line 560, and configured sensors 570, such as BHP and BHT sensors, for example. Deployed fiber-line 550 extends between the tool and a receiver at or near the surface.

Figure 6A:
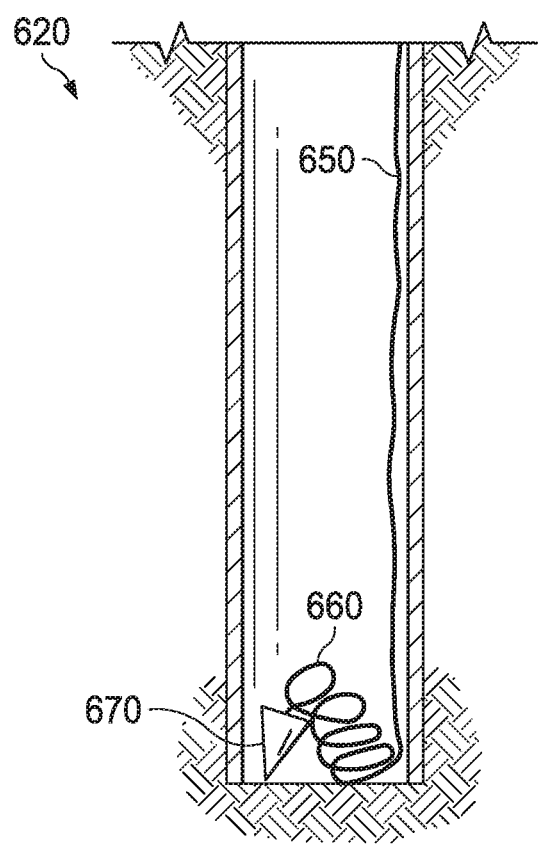
FIG. 6A illustrates an embodiment of a FLIT at the bottom or "sump" of a well where the soluble housing enclosure has dissolved.

Referring to FIG. 6A an embodiment of a FLIT traveling down a wellbore 620 and reaching the bottom or "sump" of the well where the soluble housing enclosure has dissolved is shown. The FLIT previously comprised a soluble housing, which has now dissolved. What remains is a spool of fiber-line 660, and configured sensors 670, such as BHP and BHT sensors, for example. In an embodiment, for example, a fiber optic Bragg grating gauge may be configured. A deployed fiber-line 650 extends between the tool and a receiver at surface. In this state, so long as robust sensors 670 are configured, the sensors can still garner accurate pressure, temperature, and other readings downhole, depending on what sensors are configured, that can be relayed to the surface.

Figure 6B:
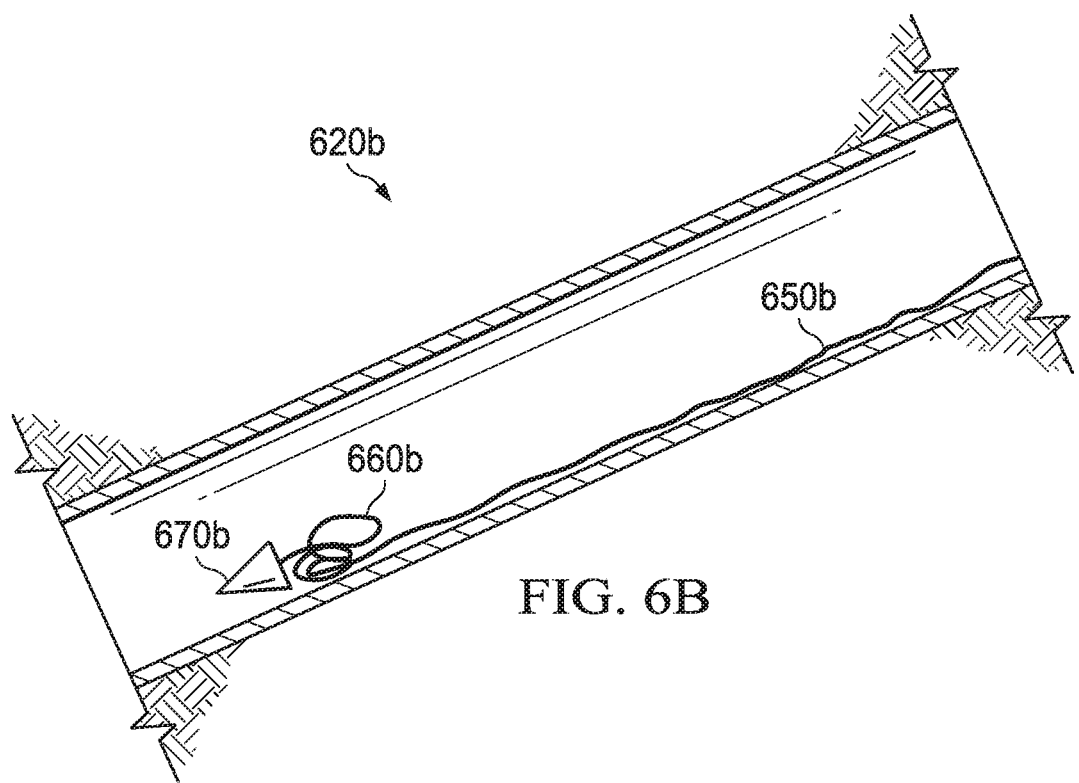
FIG. 6B illustrates an embodiment of a FLIT at a resting point in a deviated well where the soluble housing enclosure has dissolved.

Referring to FIG. 6B an embodiment of a FLIT traveling down a wellbore 620b of a deviated well and reaching a resting point in a deviated well section is shown. The FLIT previously comprised a soluble housing, which in the view shown has now dissolved. What remains is a spool of fiber-line 660b, and configured sensors 670b, such as BHP and BHT sensors, for example. A deployed fiber-line 650b extends between the tool and a receiver at surface. In this state, so long as robust sensors 670b are configured, the sensors can still garner accurate pressure, temperature, and other readings downhole, depending on what sensors are configured, that can be relayed to the surface. In an embodiment, the fiber-line may not reach the bottom of a wellbore or may just reach the bottom, in such cases the fiber-line would be taught and no spool would remain. Further, in an embodiment, once a soluble housing has come to rest, it is possible that the housing will continue to move down the wellbore. Similarly once a housing has dissolved it is also possible that the sensors will continue to move down the wellbore and that the remaining spool will continue to unwind.

Well testing is often used to determine the reservoir capacity to produce fluids and this is often done by pressure buildup/drawdown testing. Such testing can also include static bottomhole pressure, data analysis regarding wellbore integrity issues, hydraulic fracture monitoring and remedial treatment monitoring.

Figure 7:
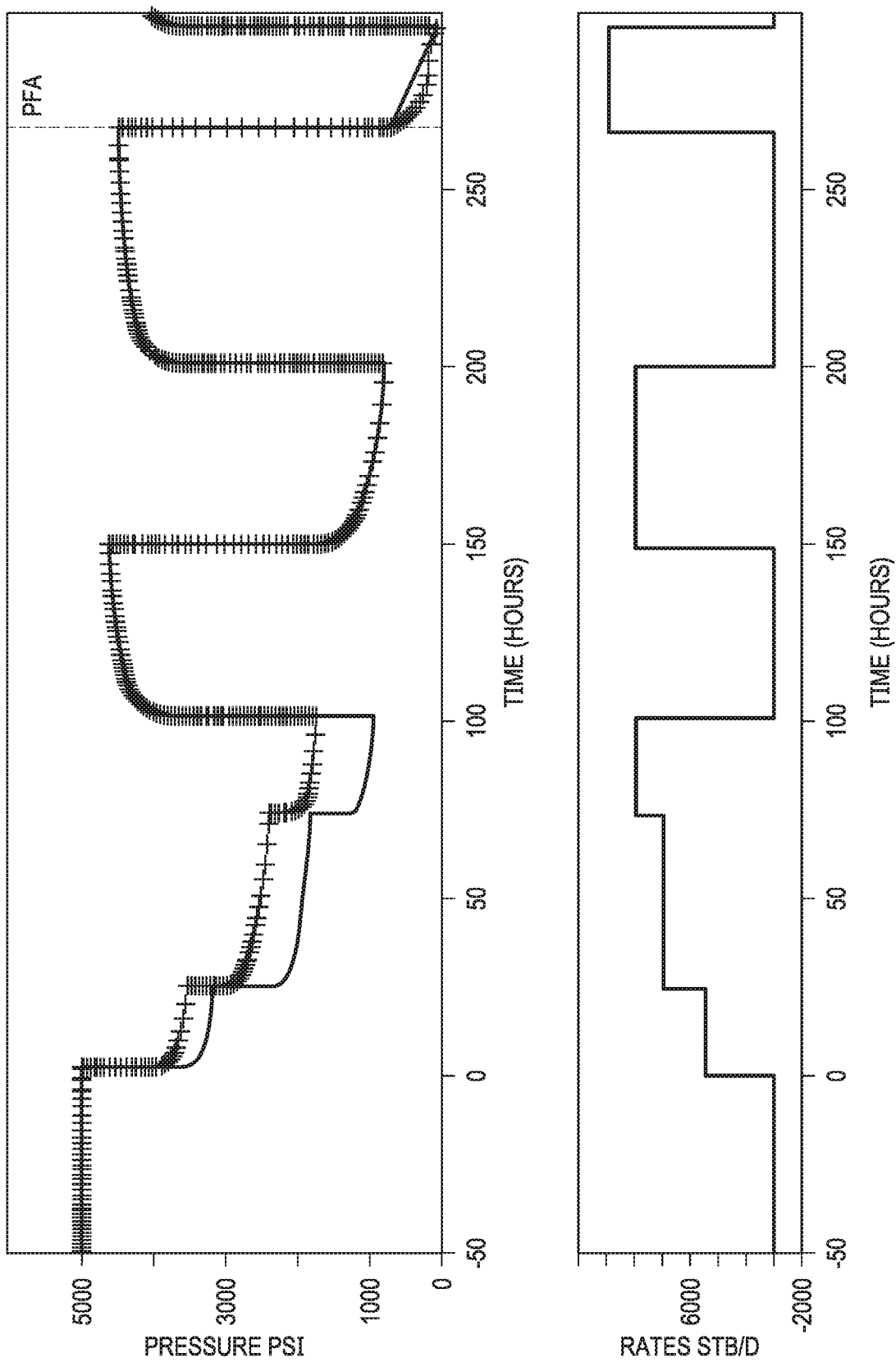
FIG. 7 illustrates an example of a pressure transient over time during well testing as can be measured by sensors deployed downhole.

Referring to FIG. 7, shows a typical pressure/flow rate data that is used to analyze well performance. If this is done with a prior art configuration that utilizes logging and/or "memory mode" where the reservoir engineers do not have access to the data in real time, the measurement periods must be extended to ensure that there is enough data to analyze once the tool is brought to the surface and the memory contents are transferred. Utilizing embodiments of the current invention, the reservoir engineers are able to see these transients real time and they can respond by either drawing down the well more or shutting the well in for a build-up. This saves time by avoiding unnecessary long flow periods, allows decision to be made real time to ultimately get better quality results and saving time and costs.

Referring to FIG. 8, an example of experimental test results for a hydrostatic pressure test over time as can be measured by sensors deployed in a FLIT is shown. For this example, a FLIT was dropped into a water well to a depth of approximately 1500 ft.

Figure 9A:
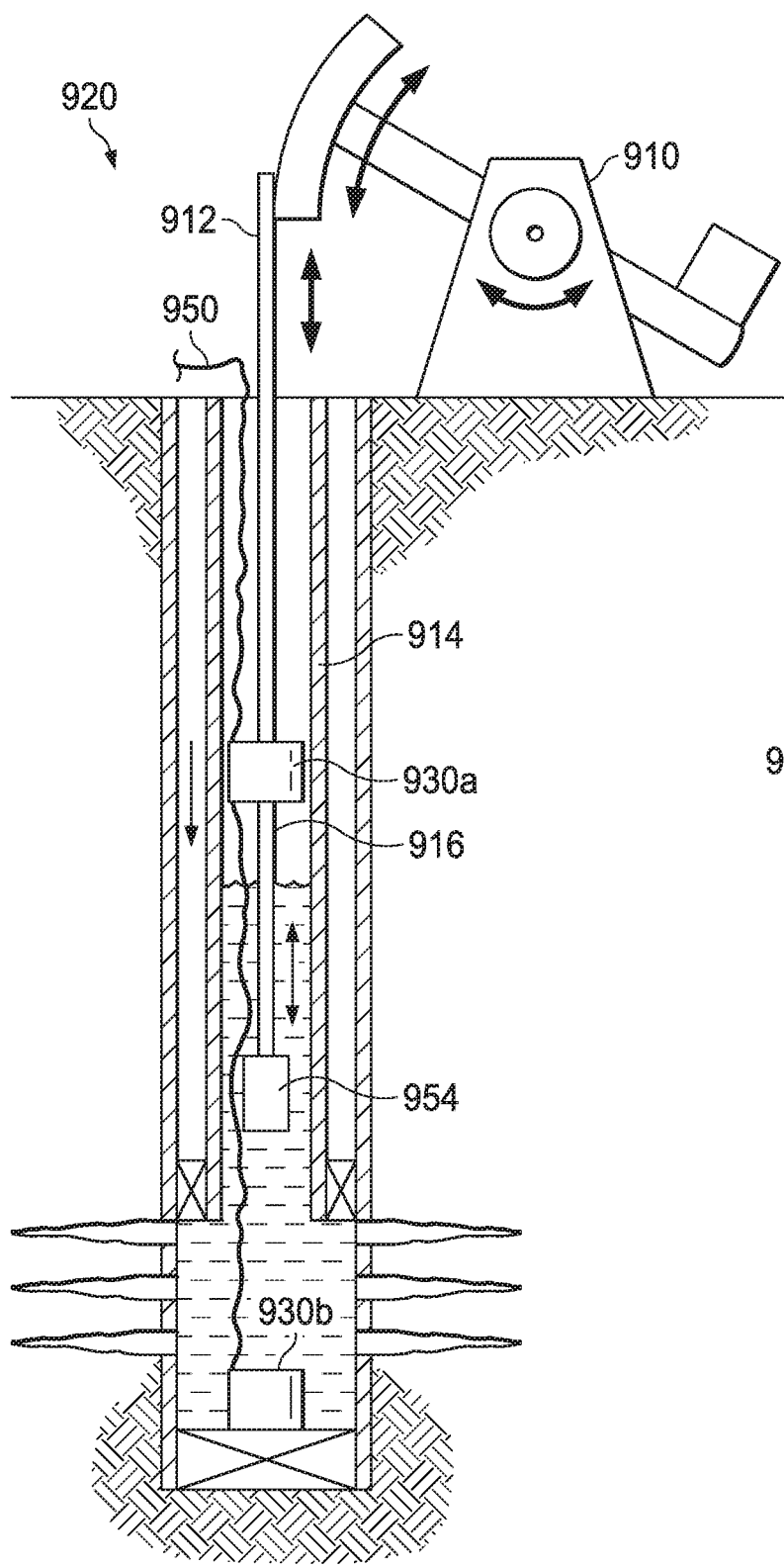
FIG. 9A illustrates an example embodiment of a FLIT deployed in a sucker rod configured well such that the FLIT is resting at the bottom or "sump" of a well.
Figure 9B:
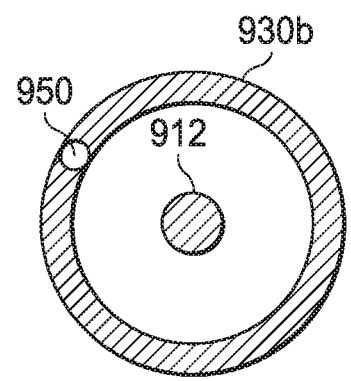
FIG. 9B illustrates a top view cross-section of the wellbore of FIG. 9A.

Referring to FIG. 9A, an example embodiment of a sucker-rod configured FLIT 930a and 930b is shown at two separate positions as it is deployed in a sucker rod configured well 920. The FLIT is shown during deployment at label 930a and the FLIT is shown at its resting position after deployment at label 930b. Referring to FIG. 9B, a top down view of the sucker-rod configured FLIT 930b is shown. This view shows an embodiment of the "donut shape" of the FLIT 930a, which has a cavity between its walls, and also the location of the fiber-line 950 that is spooled in the FLIT 930a and unwinds from the FLIT 930a during deployment. In this view, the FLIT 930a is shown as it travels downwards in the wellbore such that sucker rod 912 is positioned in the internal cavity of the FLIT 930a. Again referring to FIG. 9A, the FLIT 930a, 930b is deployed at the surface and is placed around sucker rod 912 that connects to a pump jack 910. The FLIT 930a travels downward towards the lower section 916 of the sucker rod 9121 and over plunger rod 954. In an embodiment, multiple sucker rods can, and often will be connected and deployed in a given well, the "donut shape" embodiment of the FLIT 930a, 930b can be configured with sufficient space in the middle section to allow the FLIT 930a, 930b to travel over the connections between sucker rods which often have wider diameters than the sucker rods themselves. In an embodiment the FLIT 930a, 930b will continue to travel downward until the FLIT 930a, 930b passes over a sucker rod connected plunger 954 and comes to rest at the bottom or "sump" of a well (see resting position of FLIT shown by label 930b).

Similar to previously discussed embodiments, in an embodiment, the FLIT 930a, 930b can include a housing made of soluble material. In an embodiment, the FLIT 930a, 930b can also include configured sensors such as temperature and pressure sensors as previously discussed.

Figure 10A:
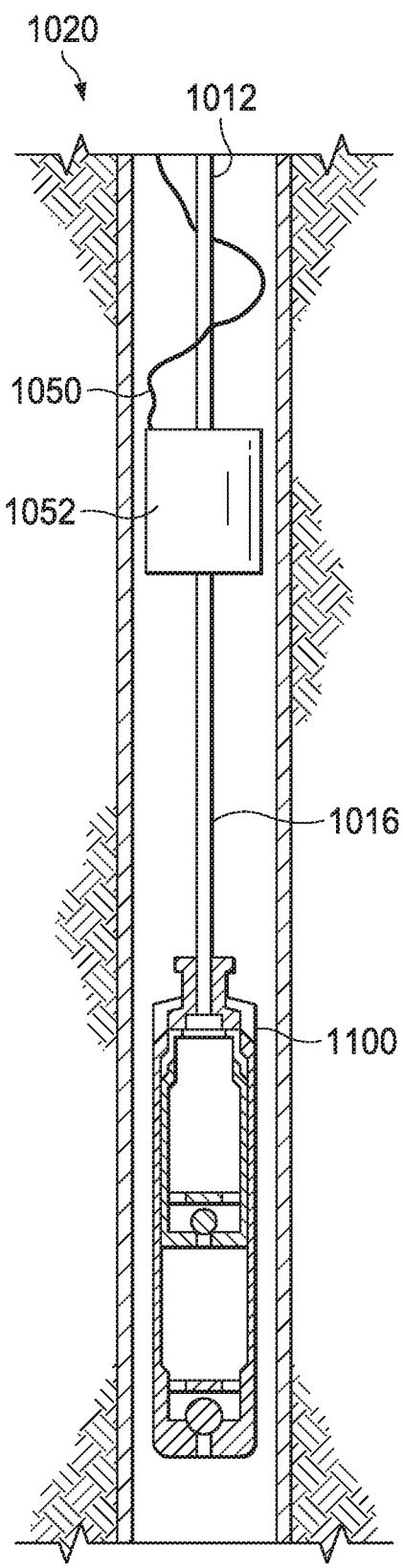
FIG. 10A illustrates an embodiment of a FLIT deployed in a sucker rod configured well where the FLIT is donut shaped to allow for a sucker rod to pass through the FLIT.
Figure 10B:
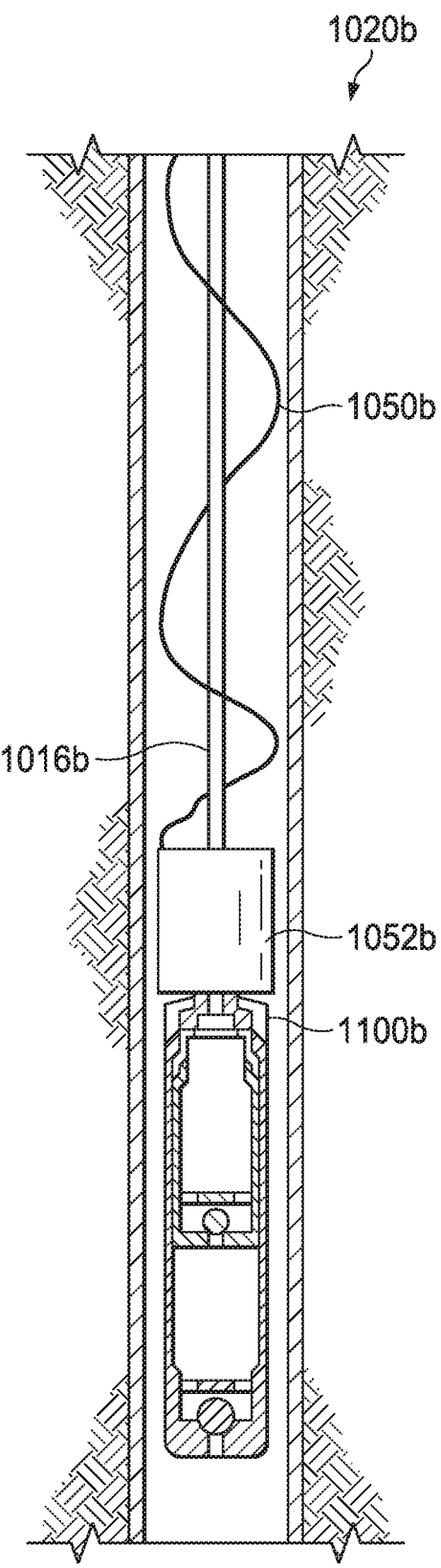
FIG. 10B illustrates an embodiment of a FLIT deployed in a sucker rod configured well where the FLIT is donut shaped to allow for a sucker rod to pass through the FLIT and the FLIT has come to rest on the top portion of a sucker rod plunger assembly.

Referring to FIGS. 10A and 10B, an embodiment of a FLIT 1052, 1052b deployed in a sucker rod configured well 1020, 1020b is shown. In this embodiment, the FLIT is "donut shaped" to allow the FLIT 1052, 1052b to pass over the sucker rod 1012 or stack of connected sucker rods, eventually passing over the lowermost portion of the sucker rod 1016, 1016b or sucker rod stack. After the FLIT 1052, 1052b passes over the lowermost portion of the sucker rod 1016, 1016b or sucker rod stack, it can come to rest on the plunger assembly 1100, 1100b. In this embodiment the internal cavity of the FLIT 1052, 1052b is configured with an internal diameter that is wide enough to pass over sucker rods but narrow enough to come to rest on a sucker rod plunger 1100, 1100b. This embodiment allows for sensors to be configured in the FLIT and for measurements to be taken at the plunger rather than at the sump of the well.

In an embodiment, the FLIT 1052, 1052b can be made of soluble or non-soluble material depending on the desired use. Similarly, if desired, in other embodiments discussed previously, the FLIT's could be made of non-soluble material if desired for a particular well.

In any of the above-discussed embodiments, a battery powered micro-computer can be configured and deployed with the BHP and BHT sensors such that the micro-computer is configured to interface with the sensors and record and communicate measurements taken by the sensors at configured intervals to the surface via the fiber-line. The micro-computer can be configured with fiber-line communication equipment, including transmitters, to send data to the surface. In an embodiment, the micro-computer can also be configured with receivers to receive communications or control signals from the surface or both. For example, if a particular sensor is malfunctioning or its output is no longer desired a control signal to turn a particular sensor off may be sent. It may also be desirable to turn particular sensors on and off as needed for power management or other reasons. In an embodiment, a fiber optic Bragg grating strain gauge can be configured, in such an embodiment the packaging of the gauge is comparatively small as compared to other sensor types and there is no power requirement, such as having a separate battery configured downhole.

In an embodiments, the downhole housing can be configured with other sensors as may be desirable to monitor for a particular well.

In an embodiment, a housing that is made from a non-soluble material may be left in a well or retrieved from the well when desirable. Similarly, a soluble housing that has not yet dissolved fully may be left in a well or retrieved from the well when desirable.

In an embodiment, the BHP and BHT sensors, as well as other sensors that may be configured, can also be configured to directly connect to the fiber-line and send measurement communications to the surface directly without the need for a micro-computer to be configured as part of the deployed package. In an embodiment, a multiplexer can be employed to manage and separate the communications between various sensors, whether downhole or at the surface. In an embodiment, a bus communications management protocol can be configured to manage and separate the communications between various sensors.

In an embodiment, a fiber-line running to the surface from a FLIT can connect to fiber-line communications equipment at the well head that communicates to or includes a data acquisition unit that can transmit the data real time to another onsite location or even offsite.

The invention claimed is:

1. A well measurement system comprising: a fiber-line intervention tool, further comprising:
    a housing,
    a fiber-line spool comprising wound fiber-line that is configured to unwind during deployment of the fiber-line intervention tool, the fiber-line spool configured in the housing,
    one or more sensors configured in the housing, and the one or more sensors configured to connect to the fiber-line of the fiberline spool such that the one or more sensors can send measurement data across the fiber-line to the surface,
    the one or more sensors configured to include at least one Bragg grating pressure sensor and one Bragg grating temperature sensor positioned at the end of fiber-line thereby providing production monitoring of pressure and temperature at a single location within the well,
    the housing made of a soluble material that is configured to dissolve alter a predetermined exposure period where the predetermined exposure period is pre-determined prior to the deployment of the housing and configured to match with or exceed an intended measurement time period for the one or more sensors configured in fee housing,
    a surface receiver that connects to the fiber-line and is configured to receive the measurement data from the one or more sensors.

2. The well measurement system of claim 1, wherein the housing of the fiber-line intervention tool is configured to be deployed through a surface deployment cap of a wellhead and run down the central passage of the wellhead through a swab valve.

3. The well measurement system of claim 1, wherein the fiber-line is configured to run through open master and lubricator valves and extends outside of a wellhead at the surface.

4. A well measurement system for a sucker rod configured well comprising:
    a fiber-line intervention tool, further comprising:
    a housing configured with a cylindrical shape and an inner cavity, the inner cavity having sufficient diameter such that the cavity diameter is greater than a sucker rod diameter at a particular wellsite,
    a fiber-line spool cavity configured with wound fiber-line that is configured to unwind during deployment of the fiber-line intervention tool, the fiberline spool housed in the housing, one or more sensors configured in the housing, and a connection between the one or more sensors and the fiber-line spool such that the one or more sensors can send measurement data across the fiberline to the surface,
    the one or more sensors configured to include at least one Bragg grating pressure sensor and one Bragg grating temperature sensor positioned at the end of fiber-line thereby providing production monitoring of pressure and temperature at a single location within the well,
    the housing made of a soluble material that is configured to dissolve after a predetermined exposure period where the predetermined exposure period is pre-determined prior to the deployment of the housing and configured to match with or exceed an intended measurement time period for the one or more sensors configured in the housing,
    a surface fiber-line receiver that connects to the fiber-line and is configured to receive the measurement data from the one or more sensors.

5. The well measurement system of claim 4, wherein the housing of the fiber-line intervention tool is configured to be deployed through a surface deployment cap of a wellhead and run down the central passage of the wellhead through a swab valve.

6. The well measurement system of claim 4, wherein the inner cavity of the housing has sufficient diameter such that the inner cavity diameter is greater than a sucker rod end fitting diameter at a particular wellsite.

7. The well measurement system of claim 4, wherein the inner cavity of the housing has sufficient diameter such that the inner cavity diameter is greater than a plunger diameter at a particular wellsite, thereby allowing the housing to deploy to the sump or bottommost portion of a particular well.

8. A method for deploying a well measurement system, the method comprising the steps of:
    configuring a fiber-line intervention tool for deployment at the surface, the tool comprising:
    a housing,
    a fiber-line spool cavity configured with wound fiber-line that is configured to unwind during deployment of the fiber-line intervention tool, the fiberline spool housed within the housing, one or more sensors configured in the housing, and a connection between the one or more sensors and the fiber-line spool such that the one or more sensors can send measurement data across the fiberline to the surface,
    the one or more sensors configured to include at least one Bragg grating pressure sensor and one Bragg grating temperature sensor positioned at the end of fiber-line thereby providing production monitoring of pressure and temperature at a single location within the well, the housing made of a soluble material that is configured to dissolve after a predetermined exposure period where the predetermined exposure period is pre-determined prior to the deployment of the housing and configured to match with or exceed an intended measurement time period for the one or more sensors configured in the housing.

9. The well measurement system of claim 8, comprising the following additional steps in regard to deploying the fiber-line intervention tool:

connecting the fiber-line of the fiber-line intervention tool to a surface fiber-line receiver that connects to the fiber-line and is configured to receive the measurement data from the one or more sensors, receiving measurement information from the one or more sensors to the surface fiber-line receiver over the fiber-line.

10. The well measurement system of claim 8, wherein the housing of the fiber-line intervention tool is configured to be deployed through a surface deployment cap of a wellhead and run down the central passage of the wellhead through a swab valve.

11. The well measurement system of claim 10, comprising the following additional steps in regard to deploying the fiber-line intervention tool:

opening the surface deployment cap and inserting the fiber-line intervention tool into the wellhead such that the fiber-line is configured to relay information outside of the wellhead, closing the surface deployment cap such that the fiber-line is still configured to relay information outside of the wellhead, and opening the swab valve such that the fiber-line intervention tool can drop into the well.

* * * * *

UNITED STATES PATENT AND TRADEMARK OFFICE
CERTIFICATE OF CORRECTION

PATENT NO. : 10,955,264 B2
APPLICATION NO. : 15/878919
DATED : March 23, 2021
INVENTOR(S) : Jonathan W. Brown, Kirk Bartko and Brett Bouldin Page 1 of 1

It is certified that error appears in the above-identified patent and that said Letters Patent is hereby corrected as shown below:

In the Claims

In Claim 1, Column 7, Line 56, the claim language reads: "to dissolve alter a predetermined exposure period" - It should read: --to dissolve after a predetermined exposure period--; and In Claim 1, Column 7, Line 61, the claim language reads: "configured in fee housing." - It should read: --configured in the housing.--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*